Aug. 27, 1940.  H. E. CHILES  2,212,729

BIT

Filed Nov. 10, 1939

Inventor
H. E. CHILES.
By J. Vincent Martin
and
Ralph R. Browning
Attorneys

Patented Aug. 27, 1940

2,212,729

UNITED STATES PATENT OFFICE 2,212,729

BIT

Harrell E. Chiles, Seagraves, Tex., assignor to Reed Roller Bit Company, Houston, Tex., a corporation of Texas Application November 10, 1939, Serial No. 303,738

1 Claim. (Cl. 255—71)

This invention pertains to roller bits, and more particularly to those in which cross cutters are mounted on a transverse shaft at the forward end of the bit.

In bits of this type it is obvious that strength and rigidity of the roller shaft are of prime importance, and such qualities are best achieved by making the shaft integral with the depending legs which support it. This construction, however, creates the problem of joinder between two sections of shaft, since the shaft must be made in two pieces to permit the rollers to be placed thereon. Various types of joints have been utilized for this purpose, such as that covered in the application of Clarence H. Black, Serial No. 299,088, filed October 12, 1939, but, so far as I am aware, no one has developed a joint in a structure of this kind embodying the features of my invention, by which additional rigidity and durability of the cross cutter shaft are attained.

The object of this invention is to increase the strength and durability of the cross cutter shafts of drill bits.

This and other objects may be accomplished by my invention, two specific examples of which are illustrated in the accompanying drawing and hereinafter fully described.

Figure 1:
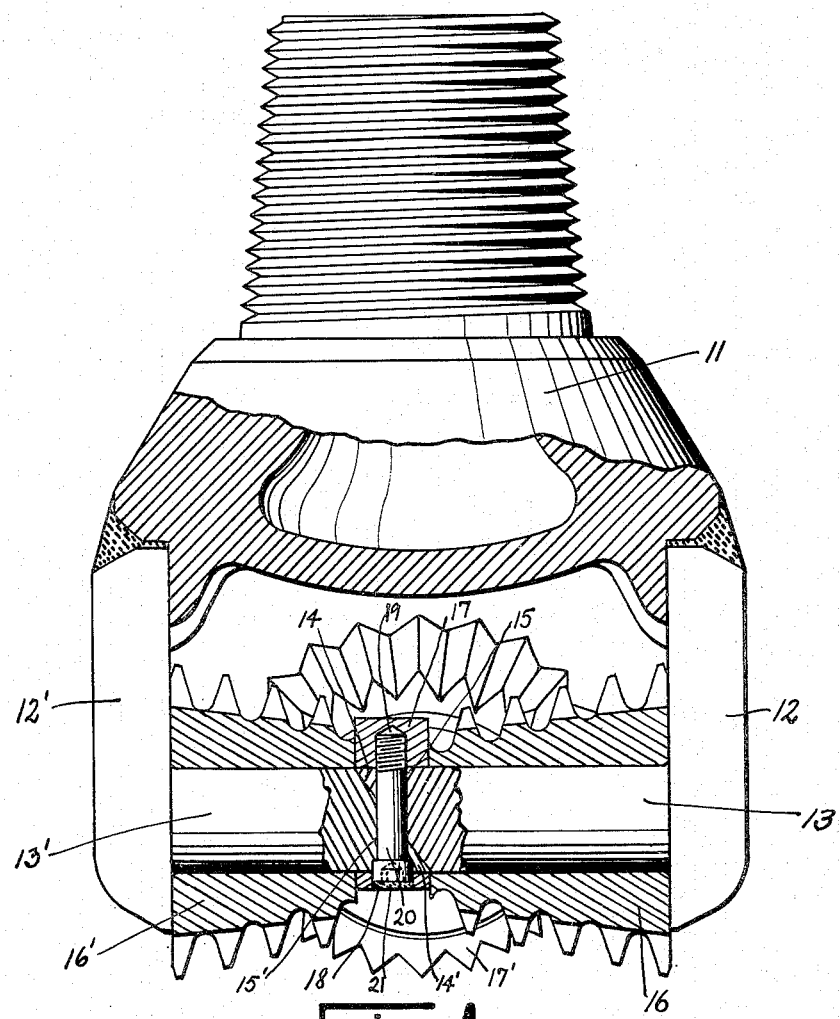
Figure 2:
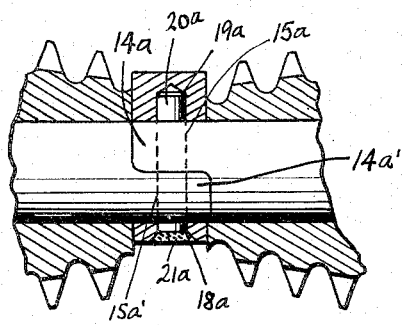

Further objects and features will become evident from the following disclosure, when taken in connection with the accompanying drawing, in which:

Fig. 1 is a side view, mostly in cross-section, of a drill bit embodying my device; and Fig. 2 is a fragmentary cross-sectional view of a modification thereof.

Referring to the drawing in detail, a bit body 11 carries, welded thereto, depending legs 12, 12'. Made integral with the legs are shaft sections 13, 13' of the cross cutter shaft, and the ends of these sections are cut off at an acute angle to the shaft axis to form interfitting projections 14, 14', which coact to produce a smooth cylindrical joint. Registering holes 15, 15' are drilled through the projections and together form a hole transversely through the shaft.

Cutters 16, 16' are mounted on the shaft sections 13, 13', and are separated by a bridge which extends between the usual side cutters 17'. This bridge has a transverse opening into which the mating ends of the two shafts extend. It also has an aperture 18 and an oppositely disposed threaded socket 19. Pin 20 is inserted in the aperture 18 and through the holes 15, 15' in the shafts 13, 13' and is screwed into the socket 19 to hold the two shaft sections firmly together. If desired, the head of the pin can be additionally secured by welding as at 21.

In the slight modification shown in Fig. 2, the mating projections 14a, 14a' are semi-cylindrical and have flat surfaces which abut each other on the longitudinal axis of the shaft. Holes 15a, 15a' are drilled through these projections and carry pin 20a, whose ends rest in aperture 18a and socket 19a similar to the structure shown in Fig. 1. Any conventional means for securing the pin may be used such as merely welding the head of the non-threaded pin as at 21a. Likewise, any suitable coacting and projecting form of end portions for the shaft sections may be utilized, the two shown being merely exemplary.

In assembling, one of the cutters, such as 16, is mounted on its shaft section 13 and the bridge 17 is fitted in place. The other shaft section 13', upon which the cutter 16' has previously been mounted, is then fitted into the bridge so that the projections 14 and 14' fit together and the pin 20 is screwed into the hole 15, 15' and secured by welding, and the legs 12, 12' are welded in place on the bit head 11. By these means I produce a bit with a firm and rigid cross cutter shaft. Although a preferred embodiment is set out herein, I do not wish to be limited thereto, but only to the scope of the following claim.

I claim:

In a drill bit, depending legs, an integral cylindrical shaft section carried by each leg, roller cutters mounted on the shaft sections, and a joinder structure for the sections comprising coacting overlapping portions on the ends of the sections, semi-circular in cross-section, having registering holes therethrough perpendicular to the flat surfaces on the end portions, a member having an opening embracing the projecting overlapping portions and having apertures registering with the holes to form, together therewith, a transverse hole through the composite shaft, and a pin in said transverse hole to hold the two sections together.

HARRELL E. CHILES.